United States Patent [19]
Tingley

[11] Patent Number: 6,037,049
[45] Date of Patent: *Mar. 14, 2000

[54] REINFORCEMENT PANEL SHEET TO BE ADHERED TO A WOOD STRUCTURAL MEMBER

[76] Inventor: Daniel A. Tingley, 3310 SW. Willamette Ave., Corvallis, Oreg. 97333

[*] Notice: This patent is subject to a terminal disclaimer.

[21] Appl. No.: 09/026,754

[22] Filed: Feb. 20, 1998

Related U.S. Application Data

[63] Continuation-in-part of application No. 08/647,181, May 9, 1996, Pat. No. 5,747,151.
[51] Int. Cl.$^7$ .......................... B32B 18/00; B32B 27/04; B32B 27/12
[52] U.S. Cl. ...................... 428/299.1; 144/345; 144/350; 428/114; 428/297.4; 428/298.1; 428/299.7
[58] Field of Search ................. 428/299.1, 114, 428/297.4, 298.1, 299.7, 299.4; 144/345, 350; 442/367, 368

[56] References Cited

U.S. PATENT DOCUMENTS

| | | | |
|---|---|---|---|
| 5,026,593 | 6/1991 | O'Brien | 428/215 |
| 5,362,545 | 11/1994 | Tingley | 428/96 |
| 5,456,781 | 10/1995 | Tingley | 156/154 |
| 5,747,151 | 5/1998 | Tingley | 428/299 |

FOREIGN PATENT DOCUMENTS 224050  2/1990  New Zealand .

*Primary Examiner*—Jeff H. Aftergut
*Attorney, Agent, or Firm*—Stoel Rives LLP

[57] ABSTRACT

A method of manufacturing a glue laminated structural wood member for bearing a structural load includes bonding together multiple elongate wood segments and a synthetic fiber reinforcement with their lengths generally aligned with the length of the member. The synthetic fiber reinforcement includes multiple synthetic fiber strands held within a resin matrix and low cost fiber edges.

10 Claims, 6 Drawing Sheets

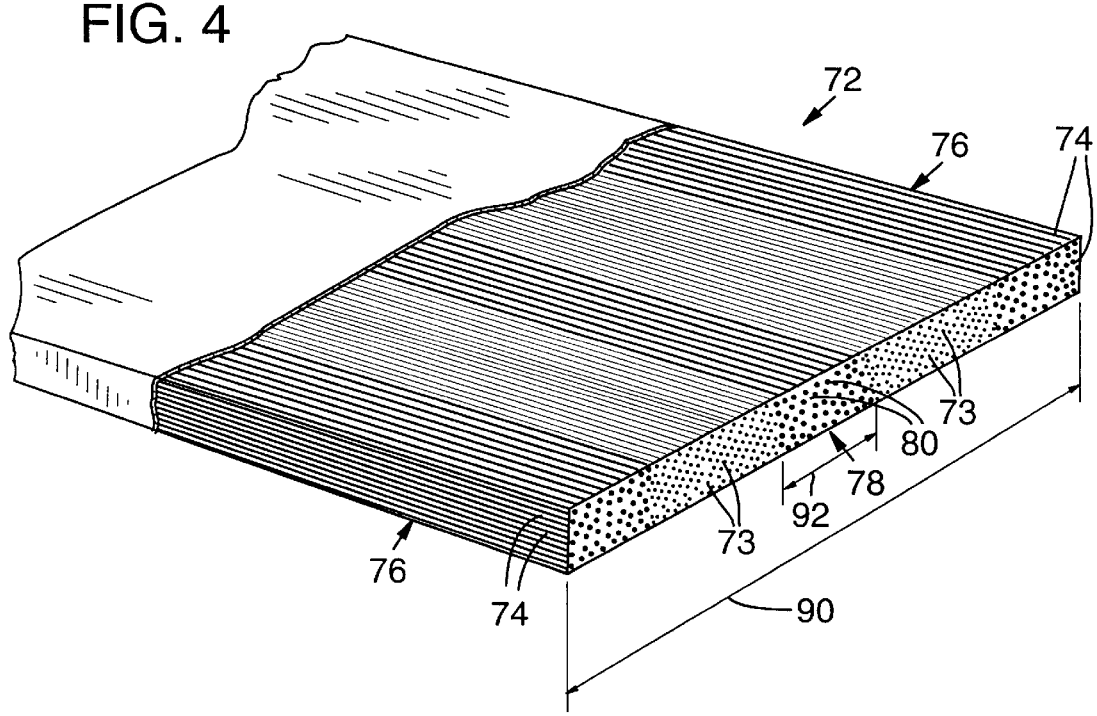
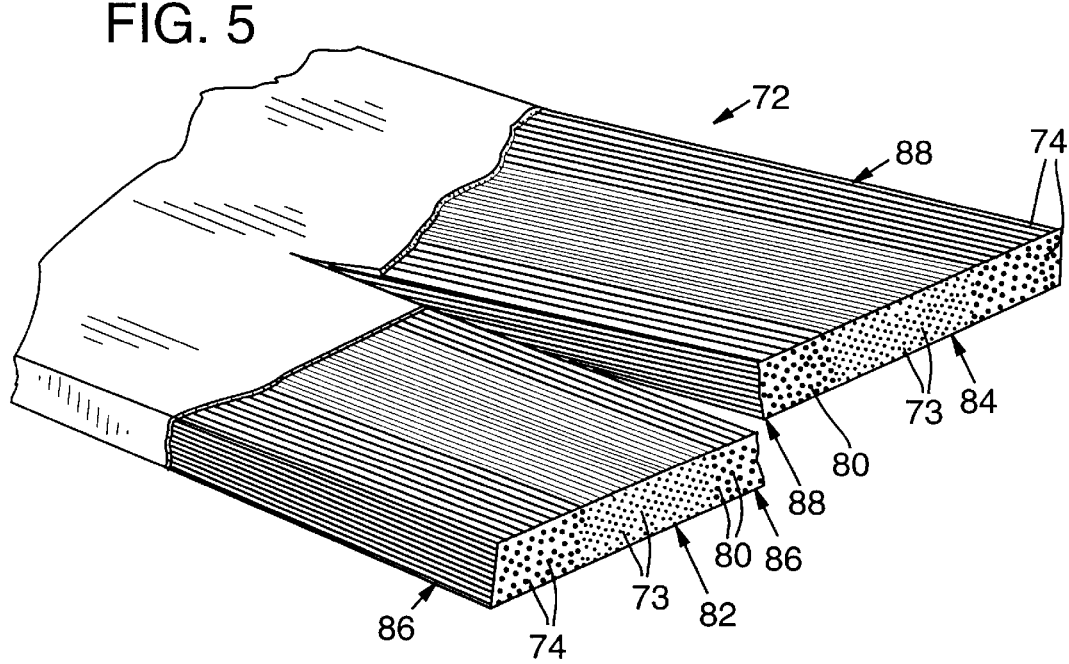

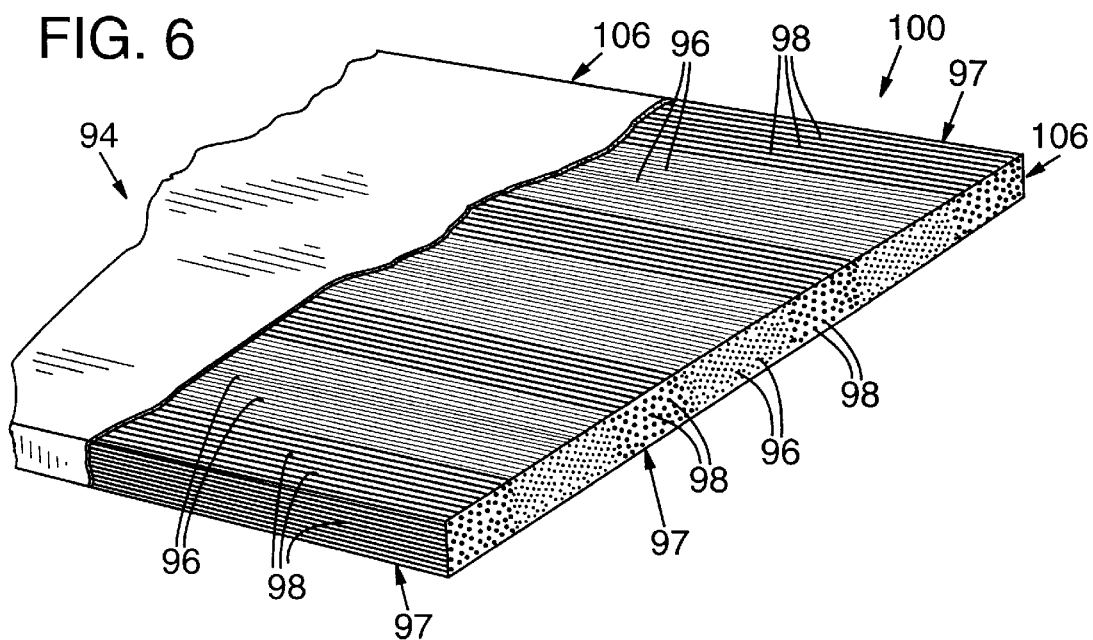
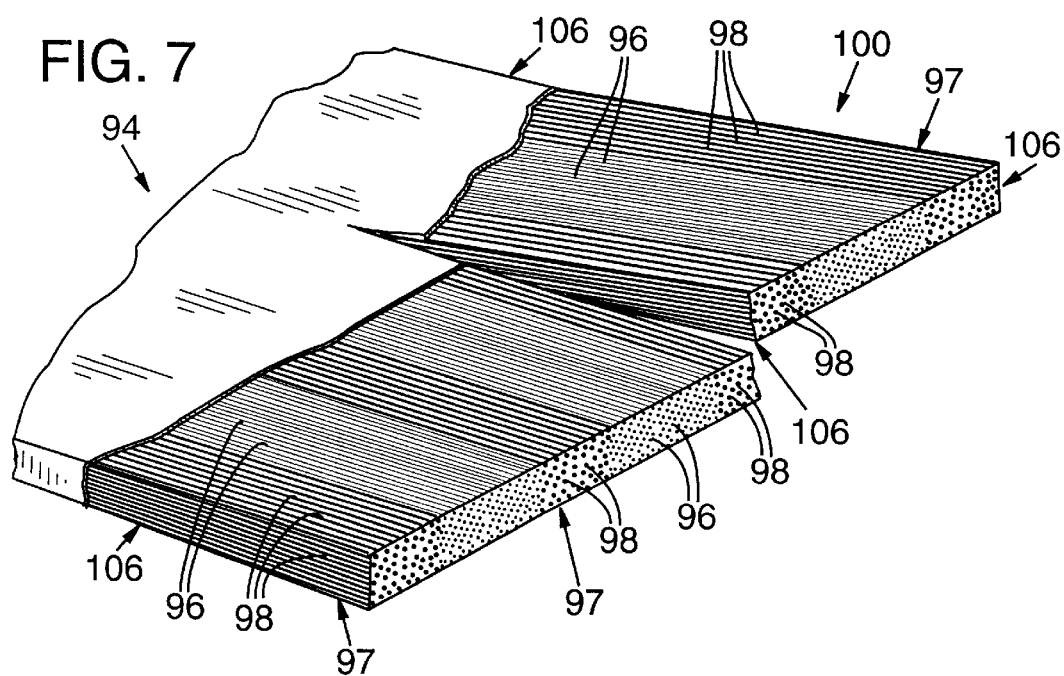

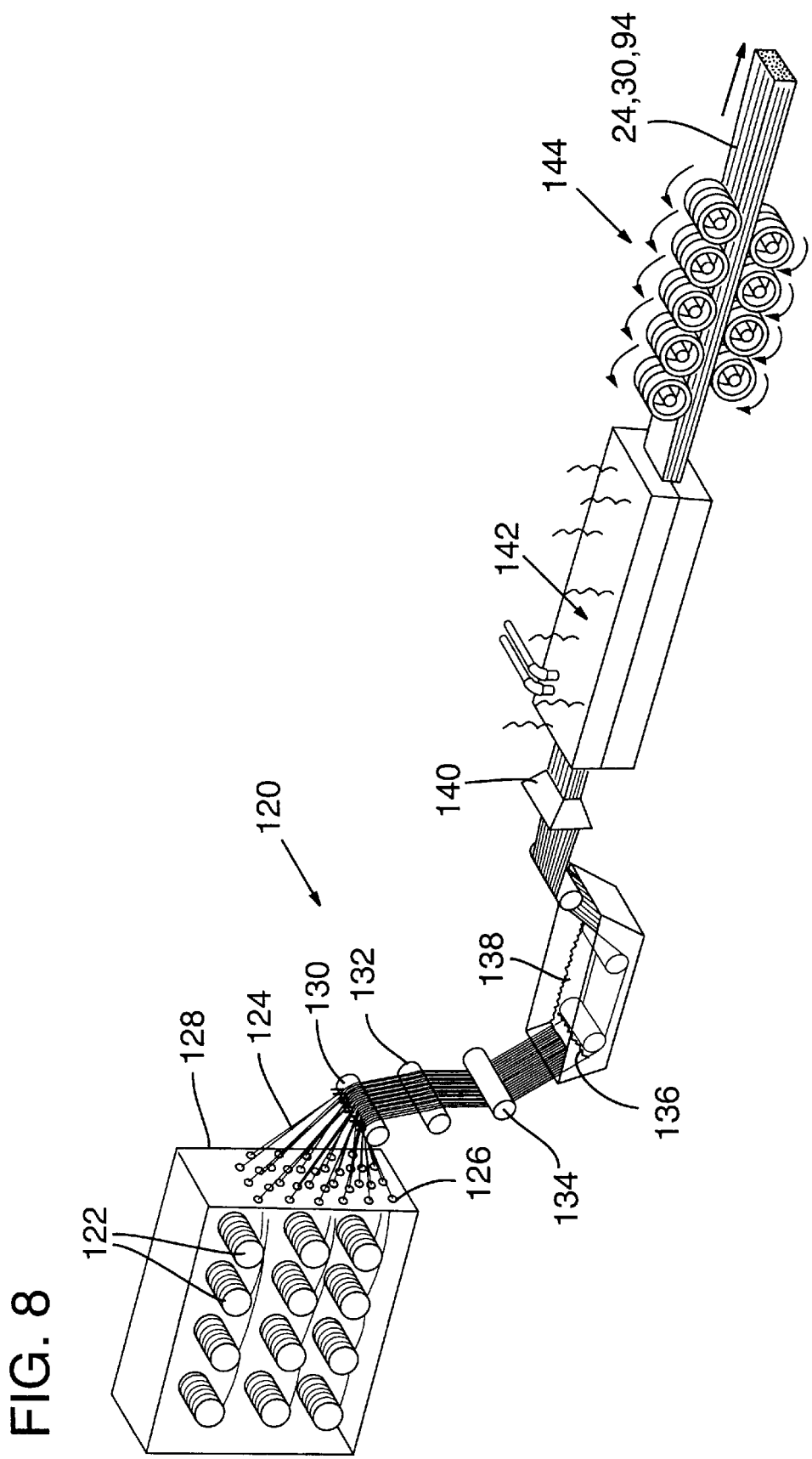

REINFORCEMENT PANEL SHEET TO BE ADHERED TO A WOOD STRUCTURAL MEMBER

This application is a continuation-in-part of U.S. patent application Ser. No. 08/647,181, filed May 9, 1996, now U.S. Pat. No. 5,747,151 which is hereby incorporated by reference.

FIELD OF THE INVENTION

The present invention relates to reinforcement of wood structural members such as beams, columns, and trusses and other members such as wood furniture, utility poles, and wood composite members. More particularly, the present invention relates to synthetic reinforcements having rough and unfinished outer side edges formed of low strength material.

BACKGROUND OF THE INVENTION

Beams, trusses, joists, and columns are the typical structural members that support the weight or loads of structures, including buildings and bridges. Structural members may be manufactured from a variety of materials, including steel, concrete, and wood, according to the structure design, environment, and cost. Wood furniture such as desks and bookshelves support weight such as computer and office equipment and heavy reference books.

Wood structural members are now typically manufactured from multiple wood segments that are bonded together, such as in glue-laminated members, laminated veneer lumber and I-beams. They can also be manufactured with wood fibers in a polymer matrix such as parallel strand timber or orientated strand board. These manufactured wood structural members have replaced sawn lumber or timbers because the former have higher design limits resulting from better inspection and manufacturing controls. Wood is a desirable material for use in many structural members because of its various characteristics, including strength for a given weight, appearance, cyclic load response, and fire resistance.

In any application, a load subjects a structural member to both compressive and tensile stresses, which correspond to the respective compacting and elongating forces induced by the load on opposite sides of the member. By convention, a neutral plane or axis extends between the portions of the member under compression and tension. The structural member must be capable of bearing the compressive and tensile stresses without excessive strain and particularly without ultimately failing.

Reinforcement of wood structural members in regions subjected to tensile stresses are known. For example, U.S. Pat. No. 5,026,593 of O'Brien describes the use of a thin flat aluminum strip to reinforce a laminated beam. The use of a synthetic tension reinforcement having multiple aramid fiber strands held within a resin matrix adhered to at least one of the wood segments in the tension portion of the structural member is described by the inventor of the present application in "Reinforced Glued-Laminated Wood Beams" presented at the 1988 International Conference on Timber Engineering.

U.S. Pat. Nos. 5,362,545 and 5,456,781 of Tingley describe methods of adhering the reinforcement to wood using conventional non-epoxy adhesives.

Manufacture of the above-mentioned reinforced structural members results in a significant amount of waste of the relatively expensive synthetic reinforcement material. This waste is generally the result of a planing process used to reduce the outside edges of the structural member to produce finished outer side edges. Additionally, planing away the synthetic reinforcement fiber strands causes significant wear on the cutting tools.

Therefore, a need exists for a method of producing structural wood members with synthetic reinforcements without significant waste of the synthetic reinforcement material. Furthermore, a need exists for a method of producing a finished edge on a structural wood member without significant wear of the cutting tools.

SUMMARY OF THE INVENTION

It is an object of this invention to provide a synthetic reinforcement panel for a laminated wood structural member having rough unfinished edges adapted to be planed away during a finishing process.

It is another object of the invention to provide a synthetic reinforcement panel having outer side edges formed of plural low strength fiber strands.

Still another object of the invention is to provide a synthetic reinforcement panel having at least one longitudinal row of low strength fibers located between the outer side edges.

Yet another object of the invention is to provide a continuous panel sheet having plural longitudinal rows of low strength fibers.

In a preferred embodiment, the present invention includes a synthetic reinforcement for glue laminated wood structural members in which multiple elongate wood segments and at least one synthetic fiber reinforcement are bonded together with their lengths generally aligned. However, the synthetic reinforcement can be used with all forms of wood and wood composites from solid wood to plywood to parallel strand lumber. The synthetic fiber reinforcement includes multiple synthetic fiber strands having a high modulus of elasticity in tension and/or compression held within a resin matrix. These fiber strands are relatively high in cost. The outer side edges of the reinforcement are formed from low strength fibers made of material such as hemp, cotton or polyester. The assembled wood member has a width formed by the rough edges of the laminae. The synthetic fiber reinforcement is formed with a width that is substantially matched to the rough width of the wood member. The rough edges are then machined to form a finished width. Only the low strength fiber edges of the reinforcement are machined away avoiding waste of the high cost synthetic fiber strands. Additionally, the low strength fiber edges cause less wear on the cutting tools. Therefore, the low strength fiber edges substantially reduce cost, reduce machinery wear, and improve overall manufacturing ease.

In another preferred embodiment, the synthetic reinforcement includes a longitudinal row of low strength fibers located between the outer side edges. The synthetic reinforcement can then be separated along the longitudinal row into separate synthetic reinforcement panels each having outer side edges formed of low strength fibers.

In still another preferred embodiment, a synthetic reinforcement sheet is formed with outer side edges of low strength fibers and plural longitudinal rows of low strength fibers located between the outer side edges. The reinforcement sheet can then be separated along the longitudinal rows to form plural synthetic reinforcement panels each having outer side edges of low strength fibers.

Additional objects and advantages of this invention will be apparent from the following detailed description of preferred embodiments thereof which proceeds with reference to the accompanying drawings.

BRIEF DESCRIPTION OF THE DRAWINGS

FIG. 4 is a perspective view of a synthetic reinforcement with low strength fiber edges and a central longitudinal row of low strength fibers.

FIG. 5 is a view similar to FIG. 4 showing the synthetic reinforcement split along the longitudinal row of low cost fibers.

FIG. 6 is a perspective view of a synthetic reinforcement sheet with plural longitudinal rows of low strength fibers.

FIG. 7 is a view similar to FIG. 6 showing the synthetic reinforcement sheet split along one of the longitudinal rows of low strength fibers.

FIG. 8 is a perspective view of a pultrusion apparatus for producing an elongate synthetic reinforcement of the present invention.

DETAILED DESCRIPTION OF PREFERRED EMBODIMENTS

Figure 1:
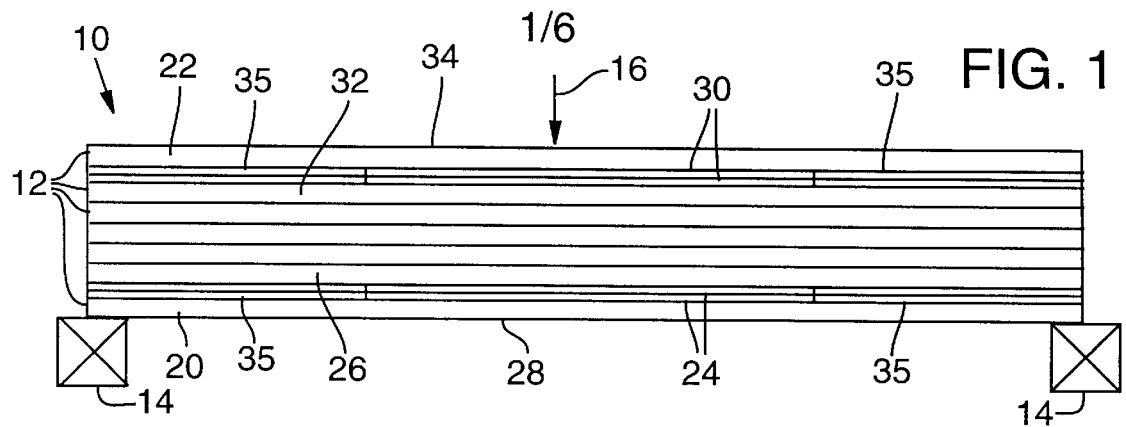
FIG. 1 is an elevation view of an exemplary glue laminated structural wood member having a synthetic fiber reinforcement according to the present invention.

FIG. 1 shows a glulam wood structural member 10 having multiple wood laminae 12 that are bonded together and are preferably elongate boards. The laminae may be solid wood, plywood, or wood composite. A number of structural composite lumber products utilize phenol resorcinol and other types of mechanical and chemical adhesives to provide a rigid or semi-rigid bond between wood fibers. Most often, the purpose of the adhesive is to provide shear transfer between the wood fibers or layers of wood fibers. Under long term loading, the wood fibers and the adhesive are subject to creep deformation. Any type of additive to the adhesive to reduce the long term creep (or the short term mechanical shear strength) would be a significant contribution to the wood composites industry. For example, glued laminated timber beams (glulam) are produced in laminating plants by gluing together dry lumber, normally of 2 in. or 1 in. nominal thickness, under controlled conditions. Parallel strand lumber (PSL) is manufactured by laminating long and narrow strands of wood veneer with the axis of the wood fibers parallel to the long axis of the PSL member. The strands are completely covered with phenol resorcinol or phenol formaldehyde and formed through a press under heat and pressure to produce a continuous member, which can be cut at any length. Laminated veneer lumber (LVL) is manufactured using wood veneers bonded together with phenol resorcinol (or another mechanical adhesive) with the grain in each layer running parallel to the adjacent sheet. LVL is used for beams, joists, headers, and flanges. Particle and fiber boards are manufactured using small wood wafers (chips, sawdust, shavings, flakes, wafers, or strands) mixed with an adhesive (numerous types of adhesives used) and formed on a mat and pressed at the required pressure and temperature to cure the adhesive.

The resulting panel products are used in a wide variety of situations. Oriented strand board is used for sheathing and diaphragm applications and also as the web member in wood I-joists. Particleboard and chipboard are used in mostly non-structural applications, such as shelves and furniture, and are notorious for excessive creep deformations. Plywood consists of thin layers of wood bonded with the grain at right angles to each other between adjacent layers (usually). A layer may consist of one or more veneers. Peeling the log on a lathe produces the veneers. The veneers are then pressed together (aligned as described above) with an appropriate type of adhesive under heat and pressure. Plywood is used for sheathing and diaphragm applications and also as the web member in wood I-joists. Other examples of where such panels are used include concrete form work panels, truck-trailor floors, cargo container floors, and scaffold planking. Reinforcing various types of panels discussed previously with high strength fibers placed in specific areas improves structural capacity, creep resistance, economic viability and long-term load resistance.

In this configuration, glue laminated wood member 10 is configured as a glue-laminated timber according to manufacturing standards 117-93 of the American Institute of Timber Construction (AITC) of Englewood, Colo.

A typical structural use of glue laminated wood member 10 is to extend as a beam over and bear a load along an otherwise open region. As a simplified, exemplary representation of such use, glue laminated wood member 10 is shown with its ends supported by a pair of blocks 14 and bearing a point load 16 midway between blocks 14. It will be appreciated, however, that glue laminated wood member 10 of the present invention could also bear loads distributed in other ways (e.g., cantilevered) or be used as a truss, joist, or column.

Under the conditions represented in FIG. 1, a lowermost lamina 20 is subjected to a substantially pure tensile stress, and an uppermost lamina 22 is subjected to a substantially pure compressive stress. To increase the tensile load-bearing capacity of glue laminated wood member 10, at least one layer of synthetic tension reinforcement 24 is adhered between lowermost lamina 20 and a next adjacent lamina 26 or, alternatively, to only an outer surface 28 of lowermost lamina 20. To increase the compressive load-bearing capacity of glue laminated wood member 10, at least one layer of synthetic compression reinforcement 30 is adhered between uppermost lamina 22 and a next adjacent lamina 32 or, alternatively, to only the outer surface 34 of uppermost lamina 22. Although two of each synthetic reinforcements 24 and 30 are shown, it is understood that any number of synthetic reinforcements 24 and 30 may be used depending on the application. Synthetic reinforcements 24 and 30 are described below in greater detail.

Synthetic tension reinforcement 24 and synthetic compression reinforcement 30 are generally centered about load 16 and preferably extend along about two-fifths to three-fifths the length of wood structural member 10, depending on load 16. It can also extend the full length of the wood structural member 10. A pair of wood spacers 35 are positioned at opposite ends of synthetic tension reinforcement 24 between laminae 20 and 26 to maintain a uniform separation therebetween. Similarly, a pair of wood spacers 35 are positioned at opposite ends of synthetic compression reinforcement 30 between laminae 22 and 32 to maintain a uniform separation therebetween. The reinforcements 24 and 30 may be place externally of the wood structural member 10.

General aspects of the process for manufacturing of glue laminated structural wood member 10 are the same as the process for manufacturing conventional glue laminated structural wood members. With regard to the manufacture of conventional glue laminated structural wood members, wood laminae are carried by a conveyor through a glue spreader, which applies multiple thin streams of adhesive along the length of each wood lamina on one of its major surfaces.

Wood laminae are successively aligned with and set against other wood laminae in a stack that may be oriented horizontally or vertically. The wood laminae are arranged so that the adhesive on the major surface of one wood lamina engages the bare major surface of an adjacent wood lamina. After all the wood laminae are aligned with and set against each other, pressure in the range of about 125–250 psi is applied to the stack and the adhesive allowed to cure. As is known in the art, sufficient pressure is applied to establish consistent gluelines between adjacent wood laminae 12 of no more than 4 mils (0.10 mm) thick. The edges of the adhered stack of wood laminae 12 are then planed to a finished width so that the sides of all wood laminae 12 are exposed to form a conventional glue laminated structural wood member. This function can be performed by sawing as well.

Epoxy is one type of adhesive suitable for use in the manufacturing process. However, epoxy is expensive. Less expensive alternatives are nonepoxy adhesives, such as resorcinol. Other nonepoxy adhesives include phenol resorcinol, formaldehyde resorcinol, melamine including cross-linked melamine, PVA including cross-linked PVA, isocyanate, polyurethane, and urea-based adhesives.

In a first preferred embodiment, synthetic fiber reinforcements 24 and 30 are carried through a conventional glue spreader (not shown), which applies multiple thin streams of adhesive along the length of each reinforcement 24 or 30 on one of its major surfaces. Adhesion between wood laminae 12 and reinforcements 24 or 30 can be relatively poor when the adhesive is applied in the conventional manner. Adhesion is improved, however, when the adhesive is spread to generally completely cover the major surfaces of synthetic fiber reinforcements 24 and 30.

It will be appreciated that such spreading of the adhesive can be accomplished by spreading the adhesive applied to one of the major surfaces of synthetic fiber reinforcements 24 and 30 or by spreading the adhesive applied to one of the major surfaces of a wood lamina to be applied to one of synthetic fiber reinforcements 24 and 30. The spreading of adhesive may be accomplished, for example, by manually spreading the adhesive before synthetic fiber reinforcements 24 and 30 and adjacent wood laminae 12 are engaged or by engaging them and sliding them against each other before the adhesive sets.

During manufacture of the wood member 10, different wood laminae 12 are successively set against each other with synthetic fiber reinforcements 24 and 30 positioned as desired to form a stack. The stack may be oriented horizontally or vertically so that the sides of adjacent wood laminae and synthetic reinforcements are aligned. Since the laminae 12 and the reinforcements 24 and 30 have substantially the same widths it is not necessary to secure reinforcements 24 and 30 to the stack with pin nails or banding as in previous reinforced wood members. Thus, the time and expense of assembling the stack is reduced.

Preferably, synthetic fiber reinforcements 24 and 30 are manufactured with respective rough widths 42 and 44 (FIGS. 2 and 3) that are substantially matched to the rough width of wood member 10 (extending into the plane of FIG. 1). Thus, the widths 42 and 44 of synthetic fiber reinforcements 24 and 30 have substantially the same original width as the wood laminae 12 used to form wood member 10. The original widths of wood laminae 12 used to form wood member 10 can vary so long as they are greater than the finished width of wood member 10. The original reinforcement width can be the average of these rough widths or whatever is suitable for conditions.

Figure 2:
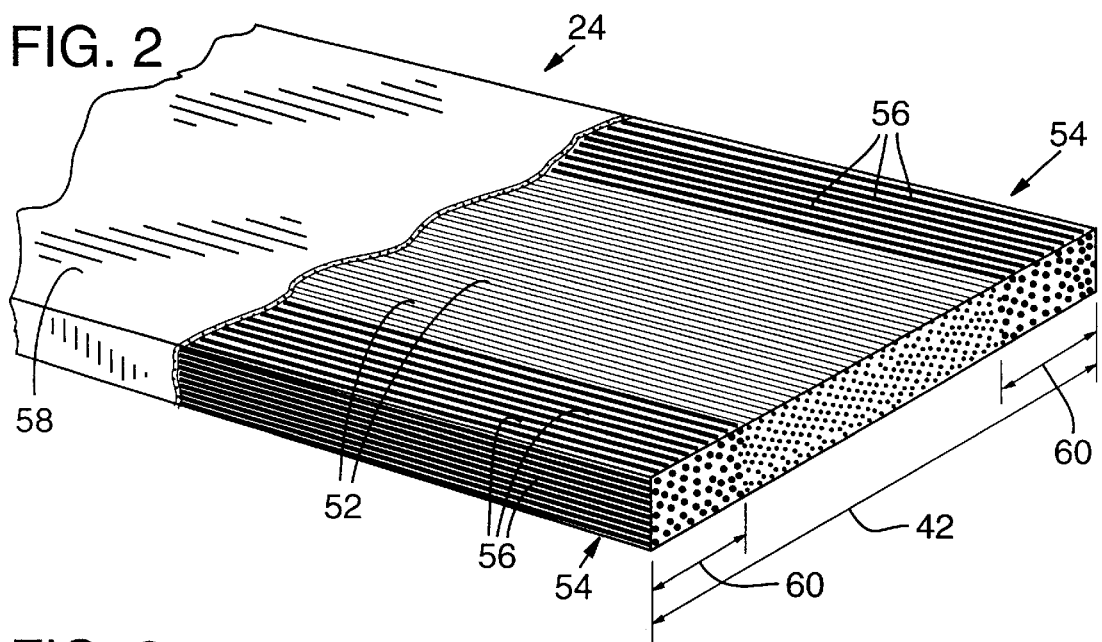
FIG. 2 is a perspective view of a section of synthetic tension reinforcement with portions cut away to show the alignment and orientation of the fibers.

FIG. 2 is an enlarged perspective view of a preferred synthetic tension reinforcement 24. The tension reinforcement 24 has a large number of synthetic fibers 52 that are arranged substantially parallel to one another and parallel to the longitudinal axis of the reinforcement 24. The fibers 52 have a relatively high moduli of elasticity in tension and may be made of, for example, an aramid or high performance polyethylene, fiberglass, or carbon having a modulus of elasticity in tension in a range of about $10 \times 10^6$ psi (69,000 Mpa) to about $55 \times 10^6$ psi (380,000 Mpa). These fibers 52 are generally high cost fibers and it is desirable to prevent waste of these fibers during machining of the wood member 10 to form finished edges. Additionally, these high strength fibers cause substantial wear on machine tools when the edges are machined away.

In order to prevent machining away of the high cost, high strength fibers 52 the edges 54 of the tension reinforcement 24 are formed from low strength, low cost cotton, hemp, and/or polyester fibers 56. For illustration purposes, the fibers 56 are shown as having a slightly larger diameter than the fibers 52. However, it is to be understood that the diameters of fibers 56 and 52 may or may not be the same. Only the outer longitudinal edges 54 are formed of the low strength fibers 56. These fibers 56 fill out the die or pack out the reinforcement profile during the pultrusion process to maintain packing fiber matrix volume ratios, alignment, and prevention of fiber crossover or rollover when the reinforcement is produced.

A resin material 58 surrounds and extends into the interstices between the low strength fibers 56 and the high strength fibers 52 to maintain them in their arrangement and alignment. The fiber/resin volume ratio of the reinforcement 24 is within a range of about 60 percent fibers/40 percent resin to about 83 percent fibers/ 17 to 40 percent resin. The reinforcement 24 has a composite modulus of elasticity in tension in a range of about $6 \times 10^6$ psi (41,000 Mpa) to about $35 \times 10^6$ psi (240,000 Mpa). To facilitate adhesion to the wood laminae 12, the reinforcement 24 is preferably manufactured and treated as described in U.S. Pat. No. 5,362,545 so that material from the fibers closest to a major surface of the reinforcement protrude from the resin. This may be done by abrading the surface with an abrasive in a direction transverse to the longitudinal direction of the reinforcement. Alternatively, the surface may be subject to a chemical treatment prior to curing the resin causing voids in the surface which remove portions of the resin and exposes the fibers. Other methods of surface treatment may include the use of broken rovings which protrude from the resin after curing, the use of an epoxy-type of adhesive to achieve sufficient bond strength, or the use of cellulose on the surface.

The original or rough edges of the wood member 10 are then machined to produce a finished edge using a high speed cutting tool. The majority of material planed away is from the low strength fiber edges of the reinforcements 24 and 30. The amount of material removed from each edge of the wood member 10 during machining is generally in the range of about 0.125 inches to about 0.5 inches. Therefore, each edge 54 preferably has a width 60 within this range. As a result, machining away of the high strength synthetic fibers 52 is avoided. Additionally, the modulus of elasticity of the low strength fibers 56 is generally less than 500,000 psi (3450 Mpa). The fibers 56 are readily machinable with conventional cutting tools, such as, for example, high speed steel planer knives. Forming the edges 54 with the low strength fibers 56 helps prevent waste of the high strength fibers 52, reduces machinery wear, and increases manufacturing effectiveness.

Figure 3:
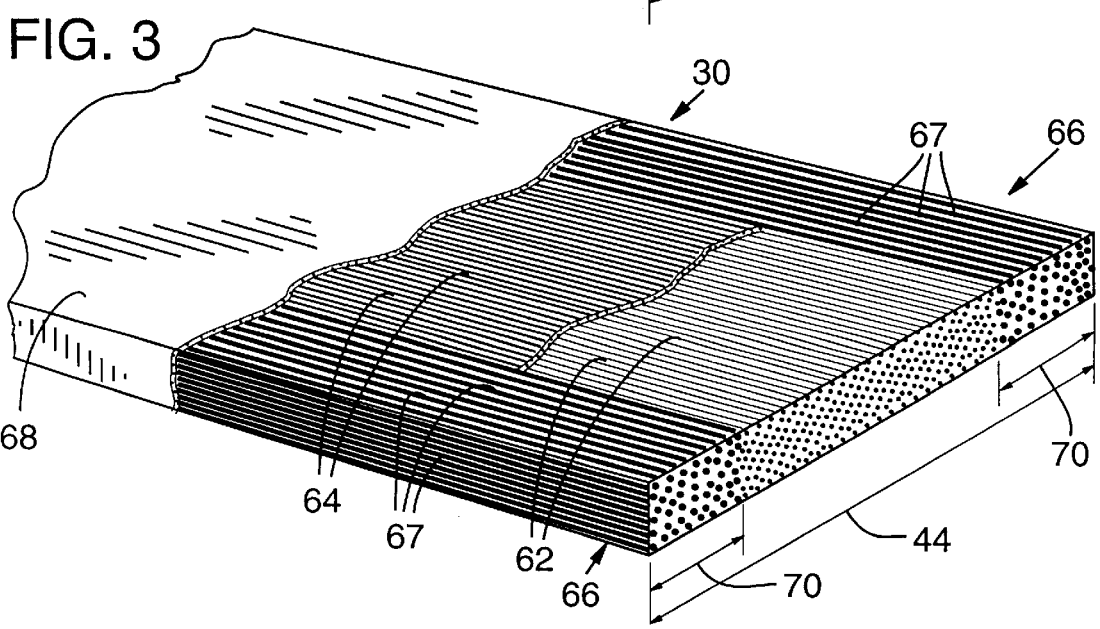
FIG. 3 is a perspective view of a section of synthetic compression reinforcement with portions cut away to show the alignment and orientation of the fibers.

FIG. 3 is an enlarged perspective view of a preferred synthetic compression reinforcement 30. The compression reinforcement 30 has a large number of synthetic fibers 62 that are arranged substantially parallel to one another and to the longitudinal axis of the reinforcement 30. These fibers may be commercially available such as carbon and fiberglass fibers, which have a modulus of elasticity in compression in the range of about $10 \times 10^6$ to $55 \times 10^6$ psi (69,000–380,000 MPa). The reinforcement 30 is manufactured substantially the same as reinforcement 24 but may include a combination of additional fibers 64 of aramid or high performance polyethylene. The fibers 62 and 64 may be layered or co-mingled. The edges 66 of reinforcement 30 are formed of low strength fibers 67 similar to fibers 56 in reinforcement 24. Resin 68 extends between the interstices of the fibers 62, 64 and 67 to maintain alignment of the fibers. The edges 66 have a width 70 in the range of about 0.125 inches to about 0.5 inches. Synthetic compression reinforcement 30 has a fiber/resin volume ratio within a range of about 60 percent fibers/40 percent resin to about 83 percent fibers/17 percent resin. The reinforcement 30 has a modulus of elasticity in compression in the range of about $18 \times 10^6$ to $19 \times 10^6$ psi (124,000–131,000 MPa).

The resin material 58 and 68 used in fabrication of both reinforcement 24 and reinforcement 30 is preferably an epoxy resin, but could alternatively be other resins such as polyester, vinyl ester, phenolic resins, polymides, or polystyrylpyridine (PSP) or thermoplastic resins such as polyethylene terephthalate (PET) and nylon-66.

FIG. 4 shows an alternative synthetic reinforcement 72 similar to the synthetic reinforcement 24 in FIG. 2 in that the synthetic reinforcement 72 has synthetic fibers 73 and longitudinal rows of low strength fibers 74 forming outer side edges 76. However, the synthetic reinforcement 72 has a longitudinal row 78 of low strength fibers 80 located between the low strength fiber outer side edges 76. The synthetic reinforcement 72 can then be split along the longitudinal row 78 as shown in FIG. 5. This produces two separate synthetic reinforcements 82 and 84 each having low strength fiber edges 86 and 88, respectively. Thus, it can be seen that the low strength fibers 80 form one side edge of each synthetic reinforcement 82 and 84. Specific dimensions, such as the overall width 90 of the synthetic reinforcement 72 may vary depending on the width desired for each resulting synthetic reinforcement 82 and 84. Additionally, the spacing of the longitudinal row 78 of low strength fibers 80 from the side edges 76 may also vary to produce synthetic reinforcements having different widths. The width 92 of each longitudinal row 78 of low strength fibers 80 may also vary depending on conditions and each application.

FIGS. 6 and 7 show another method of forming a synthetic reinforcement. In this method, a unitary sheet 94 is formed as seen in FIG. 6 having synthetic fibers 96 and longitudinal rows 97 of low strength fibers 98 spaced at various locations along the sheet 94. Individual synthetic reinforcement panels 100 can then be formed from the sheet 94 by splitting it along the longitudinal rows 97 of low strength fibers 98 as seen in FIG. 7. The resulting individual synthetic reinforcement panels 100 have outer side edges 106 formed from low strength fibers 98. As shown in FIG. 6, the longitudinal rows 97 are evenly spaced from the outer side edges 106 of the sheet 94. However, it is understood that the longitudinal rows 97 may be variously spaced to produce individual synthetic reinforcement panels of differing widths. Additionally, the widths 110 of the longitudinal rows 97 may vary.

Synthetic fiber reinforcements 24 and 30 and the synthetic fiber sheet 94 may be fabricated by various methods, such as a sheet forming or pull-forming process. Preferably, the reinforcements 24, 30, and 94 are fabricated by pultrusion, which is a continuous manufacturing process for producing lengths of fiber reinforced plastic parts. Generally, pultrusion involves pulling flexible reinforcing fibers through a liquid resin bath and then through a heated die where the reinforced plastic is shaped and the resin is cured. Pultruded parts typically have longitudinally aligned fibers for axial strength and obliquely aligned fibers for transverse strength. In accordance with the present invention, however, preferred reinforcements 24, 30, and 94 are manufactured with substantially all respective fibers in a parallel arrangement and longitudinal alignment to provide maximal strength. In some circumstances, such as to enhance shear resistance in reinforcements 24, 30, and 94 less than substantially all of respective fibers 52, 62, and 94 would be in a parallel arrangement and longitudinal alignment.

FIG. 8 shows a preferred pultrusion apparatus 120 for fabricating synthetic fiber reinforcements 24, 30, and 94. Multiple bobbins 122 carry synthetic fiber rovings 124. As is known in the art, filaments are grouped together into strands or fibers, which may be grouped together into twisted strands to form yarn, or untwisted strands to form rovings. Rovings 124 are fed through openings 126 in an alignment card 128 that aligns that rovings 124 and prevents them from entangling. Openings 126 are typically gasketed with a low friction material, such as a ceramic or plastic, to minimize abrasion of or resistance to rovings 124.

In the fabrication of the reinforcements 24, 30, and 94 it is understood that the bobbins 122 containing different fibers are constructed and arranged so that as the various fibers exit the card 128 they are arranged to form the reinforcement profiles as shown in FIGS. 2–6.

Rovings 124 pass from card 128 to a first comb 130 that gathers them and arranges them parallel to one another. Rovings 124 then pass over a tensioning mandrel 132 and under a second alignment comb 134. They pass through close-fitting eyelets 136 directly into a resin bath 138 where they are thoroughly wetted with resin material. Passing rovings 124 into resin bath 138 through eyelets 136 minimizes the waste of rovings 124 whenever the pultrusion apparatus 120 is stopped. Resin-wetted rovings 124 are gathered by a forming die 140 and passed through a heated die 142 that cures the resin material and shapes the rovings 124 into reinforcements 24, 30, and 94. Multiple drive rollers 144 pull the reinforcements 24, 30, and 94 and rovings 124 through pultrusion apparatus 120 at a preferred rate of 3–5 feet/minute (0.9–1.5 m/minute).

To minimize waste and simplify handling and use, the reinforcements 24, 30, and 94 are formed so as to be wound onto a reel (not shown) so that arbitrary lengths can be drawn and cut for use. Alternatively, the reinforcements 24, 30, 94 may be formed into pre-cut sheets. The reinforcements 24, 30, and 94 are formed with relatively small thicknesses of about 0.25 cm to about 6.4 cm (0.010 in.–0.0250 in.) and can be wound onto reels having a diameter in the range of about 99 cm to about 183 cm (39 in.–72 in.).

Pultrusion apparatus 120 is capable of forming synthetic reinforcements 24, 30, and 94 without longitudinal cracks or faults extending through and with cross-sectional void ratios of no more than 5 percent. Cross-sectional void ratios refer to the percentage of a cross-sectional area of synthetic reinforcements 24, 30, and 94 between respective fibers 52, 62, and 96 typically occupied by resin material, and is measured by scanning electron microscopy. The absence of faults and the low void ratios assure that synthetic reinforcements 24, 30, and 94 are of maximal strength and integrity.

The preferred resin materials, as described above and applied to rovings 124, have a glass transition temperature within a range of 250–300°F. Glass transition is an indicator of resin flexibility and is characterized as the temperature at which the resin loses its hardness or brittleness, becomes more flexible, and takes on rubbery or leathery properties. A glass transition temperature within the preferred range is desirable because it provides a minimal fire resistance temperature. The preferred cure rate of the resin material, which is the amount of material that cures from a monomer structure to a polymer structure, is 78 to 82 percent. It has been determined that synthetic reinforcements 24, 30, and 94 with cure rates within this range have higher shear stress bearing capabilities at interfaces with both synthetic reinforcements and wood laminae.

Preferably, a fiber tension force in the range of about three to eight pounds is applied to rovings 124 during the resin cure. The fiber tension force may be applied as a back pressure by tensioning mandrel 132 in combination with combs 130 and 134 or by the use of friction bobbins 122, wherein rotational friction of the bobbins may be adjusted to provide the desired back pressure on rovings 124. Such tension in the fibers assists in maintaining their parallel arrangement and alignment in reinforcements 24, 30, and 94. Also, by curing the resin material while the fibers are under tension, reinforcements 24, 30, and 94 have greater rigidity and therefore decrease deflection of wood member 10 upon loading.

Figure 9:
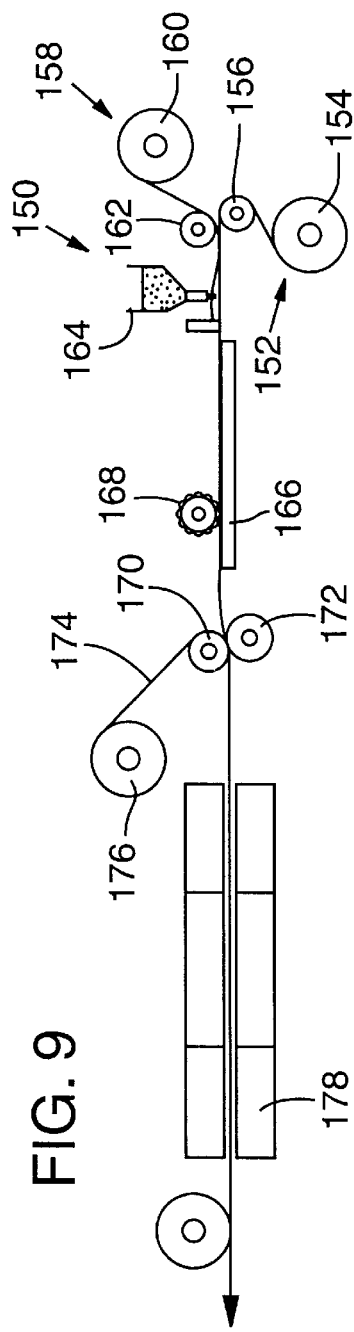
FIG. 9 is an elevation view of a sheet forming apparatus for producing an elongate synthetic reinforcement of the present invention.

FIG. 9 shows a preferred sheet forming apparatus 150 for fabricating synthetic fiber reinforcements 24, 30, and 94. In this process, a fabric material is stitched using any type of fiber having the required weight and denier aligned in different directions that may be required in the end use of the panel. The fiber is then processed between a layer of cellulose or aramid fibers on each side of the fiber for other adhesion methods described earlier. The width of the resulting panel may range from 30–50 inches and has a fiber volume of between 40–50 percent. The panel material is then rolled into coils of typically about 2,000–5,000 lineal feet depending on the thickness or is pre-cut into sheets. The lower layer of cellulose or aramid fibers 152 is fed from a lower roller 154 and lower auxiliary roller 156. The fabric sheet 158 is fed from an upper roller 160 and upper auxiliary roller 162. The fabric sheet 158 and lower layer 150 are run through a resin spray 164 over a heated table 166 maintained at a certain temperature. The fabric/fiber composite then runs past a wet-out roller 168 to thoroughly wet the composite. The composite then passes through squeeze rollers 170 and 172 to remove excess resin and maintain uniform thickness. The upper layer of cellulose or aramid fibers 174 is fed from a roller 176 over squeeze roller 170 and onto the composite. The final composite is then run through an oven 178 for final curing.

Figure 10:
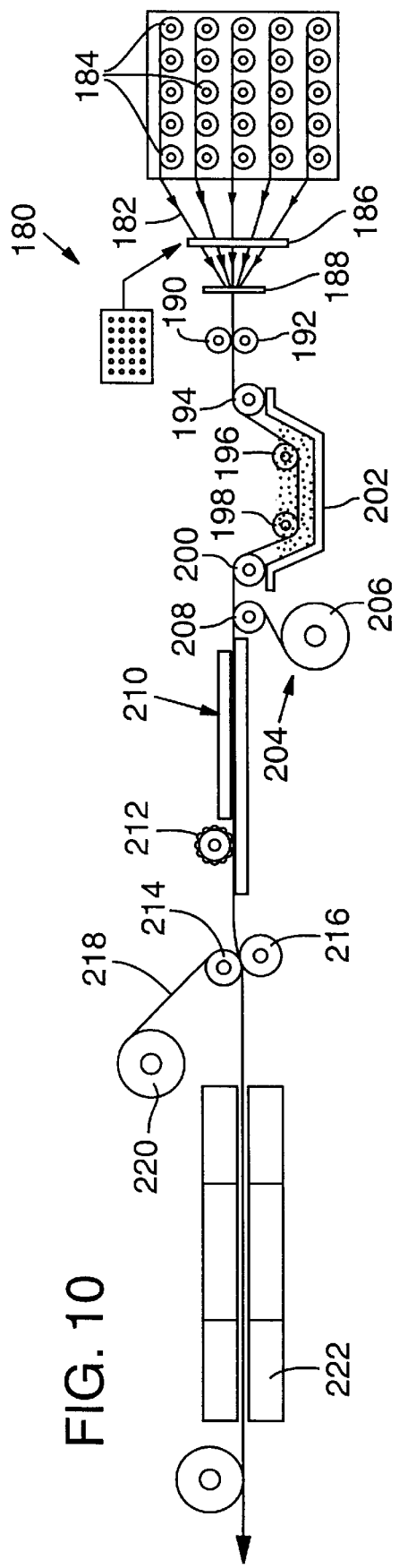
FIG. 10 is an elevation view of a pull forming apparatus for producing an elongate synthetic reinforcement of the present invention.

FIG. 10 shows a preferred pull forming apparatus 180 for fabricating synthetic fiber reinforcements 24, 30, and 94. The pull manufacturing process is a combination of the pultrusion process and the sheet forming process. Fibers 182 are pulled from friction bobbins 184 and run through alignment guard 186. From the alignment guard 186 the fibers are through a comb 188. The fibers are then run through back tensioning rollers 190 and 192 and passes over plural roller 194, 196, 140, and 146 as the fibers are passed through a resin bath 202. A lower layer of cellulose or aramid fibers 204 are fed from a roller 206 over roller 208 to combine with the fibers which run over a heated conveyor table 210 with a top platen used to pull the fibers to ensure tensioning. A wet-out roller 212 ensures complete wetting of the fibers. The fibers are then run through squeeze rollers 214 and 216 to remove excess resin. At this point an upper layer of cellulose and/or aramid fibers 218 is fed from an upper roller 220 and added to the fibers sheet. The fiber sheet is then run through ovens 222 for final curing. The resulting sheet may have a width ranging from between 20–50 inches or greater and have a fiber volume in the range of 50–60 percent.

Figure 11:
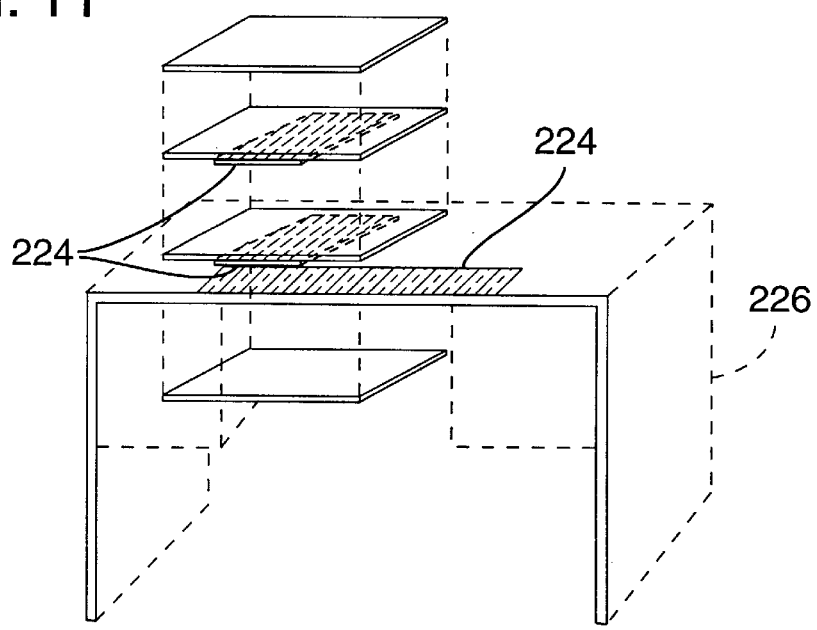
FIG. 11 is a front perspective view of a reinforcement panel in wood furniture.

The thickness of the sheet formed from the sheet forming or pull forming processes are generally less than about 2 mm in thickness. The panel may be used in multiple layers with different fibers running in different directions in different layers. The weight of fiber, type of fiber, and the direction of the fibers in each layer are designed depending upon the end use of the panel. As seen in FIG. 11, the panel 224 may not extend the entire length or width of the wood structural member and may only be used on surface areas having high stress concentration such as in wood furniture 226. This reduces the overall cost of the reinforcement. One use for such a panel includes reinforcement of foam panels. The panel can either reinforce the structure member on an outer surface or within the structural member depending upon end use.

Figure 12:
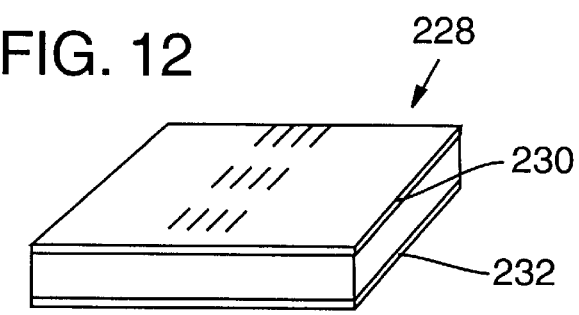
FIG. 12 is a partial perspective view of a foam panel.

Another type of reinforcement panel use includes reinforcement foam 228 (FIG. 12). Foam panels 228 are reinforced with composite panels 230 and 232 on each side of the foam panel 228 for use as structural roof panels, floor and shear panels of the walls. Alternatively, the foam panel 228 can be reinforced with chopped high strength fiber like fiberglass and carbon to increase the compressive strength of the foam for use in high tensile strength areas without the composite panels on each side.

Continuous fibers processed into a discontinuous fiber mat and held together with the help of a binder can be used to increase the strength of the member as a reinforcement without using the fibers in a polymer matrix before adhering them to the structural member. This can be done by first applying it directly in the glueline or to the surface of the structural member by passing the need for a plastic matrix.

Figure 13:
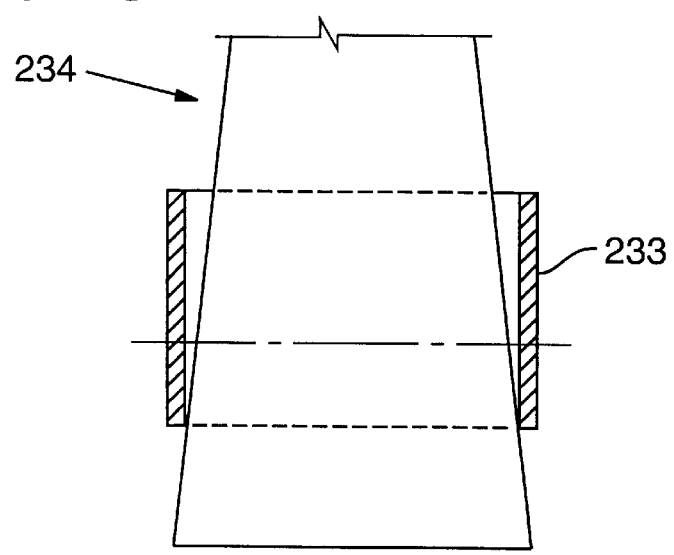
FIG. 13 is an elevation view of a reinforcement panel used with a utility pole.

Wide width panels 223 may also be used to reinforce wood utility poles 234 below ground (FIG. 13). Wood utility poles 234 are subject to decay at areas in and around the ground level. In order to repair such damage the poles 234 may be reinforced with wide width reinforcements 233 to restore strength of the poles. Multiple layers of wide width panels 223 with fibers aligned in different directions are wrapped around the pole 234 and secured with epoxy adhesives. Carbon fibers or other high compressive strength fibers can be used in the transverse direction of the reinforcement to restrain the high tangential stresses induced in the reinforcement. The stress is induced due to the radial expansion of the pole 234 by change in moisture content of the utility pole or environmental loads on the pole, e.g. wind. Polyurethane or other types of foams can be used as filler in the gap at the interface between the utility pole and the reinforcement. The panel 233 can be made by the sheet forming process using the carbon or other high compressive strength fibers in the transverse direction on one side of the panel through the thickness. The shrinkage in the matrix as it cures/polymerizes is resisted more by the carbon fibers than the other fibers in the transverse direction. This leads to a curving of the panel widthwise. The curving widthwise allows it to conform more effectively as a reinforcement to round objects, such as utility poles, concrete columns, piles and pipes.

Used as a reinforcement at a connector, such as a bolt, the reinforcement restrains the wood member from shearing at the bolted joint. The reinforcement panel increases the bolt bearing capacity of the member.

It will be obvious to those having skill in the art that many changes may be made to the details of the above-described embodiment of this invention without departing from the underlying principles thereof. The scope of the present invention should be determined, therefore, only by the following claims.

I claim:

1. A panel to be adhered to a wood structural member for increasing a load carrying capacity of the structural member, said panel having a length and two opposed major surfaces, said panel comprising:

a plurality of reinforcing fibers including fiber strands of first and second materials, the reinforcing fibers held within a resin matrix, arranged substantially parallel with one another, and aligned to comply with a direction of the panel when the panel is adhered to the structural member;

the panel having a central portion formed of plural fiber strands of the first material and absent fiber strands of the second material, the central portion having a top surface and a bottom surface forming the major surfaces of the panel; and at least one outer longitudinal width edge formed of plural fiber strands of the second material and absent fiber strands of the first material.

2. The panel of claim 1 wherein the panel has another outer longitudinal side edge opposed from the at least one outer longitudinal side edge and formed of plural fiber strands of the second material and absent fiber strands of the first material.

3. The panel of claim 2 further comprising at least one longitudinal row of plural fiber strands of the second material located between the opposed outer longitudinal side edges formed so that the panel can be separated along the at least one longitudinal row of plural fiber strands to form separate panels each having opposed longitudinal outer side edges formed of plural fiber strands of the second material.

4. The panel of claim 1 further comprising another outer longitudinal side edge opposed from the at least one outer longitudinal side edge and plural longitudinal rows of plural fiber strands of the second material between the opposed outer longitudinal side edges formed so that the panel can be separated along the plural longitudinal rows to form separate panels each having a central portion formed of plural fiber strands of the first material and absent fiber strands of the second material and opposed longitudinal outer side edges formed of plural fibers strands of the second material.

5. The panel of claim 1 in which the first material is selected from a group consisting essentially of carbon, aramid, and high modulus polyethylene.

6. The panel of claim 1 in which the second material is selected from a group consisting essentially of cotton, hemp, and polyester.

7. The panel of claim 4 in which the first material is selected from a group consisting essentially of carbon, aramid, and high modulus polyethylene.

8. The panel of claim 4 in which the second material is selected from a group consisting essentially of cotton, hemp, and polyester.

9. The panel of claim 3 in which the first material is selected from a group consisting essentially of carbon, aramid, and high modulus polyethylene.

10. The panel of claim 3 in which the second material is selected from a group consisting essentially of cotton, hemp, and polyester.

* * * * *